United States Patent
Chao et al.

(10) Patent No.: US 9,147,122 B2
(45) Date of Patent: Sep. 29, 2015

(54) POSE ESTIMATION BASED ON PERIPHERAL INFORMATION

(71) Applicant: QUALCOMM Incorporated, San Diego, CA (US)

(72) Inventors: Hui Chao, San Jose, CA (US); Yanghai Tsin, San Diego, CA (US); Faraz Mohammad Mirzaei, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 13/829,099

(22) Filed: Mar. 14, 2013

(65) Prior Publication Data

US 2013/0322767 A1    Dec. 5, 2013

Related U.S. Application Data

(60) Provisional application No. 61/653,880, filed on May 31, 2012, provisional application No. 61/656,827, filed on Jun. 7, 2012.

(51) Int. Cl.
G06K 9/62 (2006.01)
G06K 9/46 (2006.01)
G06T 7/00 (2006.01)

(52) U.S. Cl.
CPC ............ *G06K 9/4604* (2013.01); *G06T 7/0042* (2013.01); *G06T 2207/10004* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2006/0132482 A1 | 6/2006 | Oh | |
| 2009/0110267 A1 | 4/2009 | Zakhor et al. | |
| 2010/0208057 A1 | 8/2010 | Meier et al. | |
| 2010/0329513 A1* | 12/2010 | Klefenz | 382/104 |
| 2011/0115902 A1* | 5/2011 | Jiang et al. | 348/135 |
| 2012/0038549 A1 | 2/2012 | Mandella et al. | |
| 2012/0069019 A1 | 3/2012 | Richards | |
| 2013/0114851 A1* | 5/2013 | Foote et al. | 382/103 |

OTHER PUBLICATIONS

International Search Report and Written Opinion—PCT/US2013/036332—ISA/EPO—Jun. 18, 2013.
Caprile, et al., "Using Vanishing Points for Camera Calibration," International Journal of Computer Vision, vol. 4, No. 2, pp. 127-139, Mar. 1990.

* cited by examiner

*Primary Examiner* — Brian P Werner
(74) *Attorney, Agent, or Firm* — Hunter Clark PLLC

(57) ABSTRACT

A method for estimating camera pose includes: obtaining an image of a location captured via a camera, where the image includes a target object and edge line features outside of the target object; and calculating a pose of the camera with respect to the target object based on the edge line features.

40 Claims, 12 Drawing Sheets

POSE ESTIMATION BASED ON PERIPHERAL INFORMATION

CROSS-REFERENCE TO RELATED APPLICATIONS

This application claims the benefit of U.S. Provisional Application No. 61/653,880, filed May 31, 2012, entitled "POSE ESTIMATION BASED ON PERIPHERAL INFORMATION," and U.S. Provisional Application No. 61/656,827, filed Jun. 7, 2012, entitled "POSE ESTIMATION BASED ON PERIPHERAL INFORMATION," both of which are assigned to the assignee hereof and both of which are incorporated herein in their entireties for all purposes.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and utilized to locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others.

SUMMARY

An example method for estimating camera pose includes: obtaining an image of a location captured via a camera, where the image includes a target object and edge line features outside of the target object; and calculating a pose of the camera with respect to the target object based on the edge line features.

Implementations of such a method may include one or more of the following features. The method further includes identifying the target object via a computer vision algorithm independently of calculating the pose of the camera. The identifying comprises detecting key points of the target object in the image. The method further includes receiving an identity of the target object within the image from user input.

Also or alternatively, implementations of such a method may include one or more of the following features. The method further includes estimating one or more vanishing points associated with the edge line features, where the calculating comprises calculating the pose of the camera with respect to the target object based on the estimated vanishing points. The method further includes detecting the edge line features within the image. Detecting the edge line features comprises detecting horizontal edge line features and vertical edge line features. Detecting the edge line features comprises detecting at least one of a floor, a roof, or a door. Estimating the one or more vanishing points comprises at least one of estimating a horizontal vanishing point from the horizontal edge line features or estimating a vertical vanishing point from the vertical edge line features. Estimating the one or more vanishing points comprises estimating one vanishing point, and calculating the pose of the camera comprises estimating the rotation of the camera with respect to a plane, defined by the location a detectable target in the image, from a set of discrete rotation states based on the one estimated vanishing point. Estimating the one or more vanishing points comprises estimating two or more vanishing points, and calculating the pose of the camera comprises calculating the pose of the camera as at least one of pan, tilt, or roll rotation matrix with respect to a plane, defined by a detectable target in the image, based on the two or more vanishing points. Calculating the pose comprises calculating the roll, the pan, and the tilt. The method further includes obtaining information relating to at least one of the tilt or the pan from an orientation sensor coupled to the camera. The method further includes determining the roll based at least in part on the tilt.

Also or alternatively, implementations of such a method may include one or more of the following features. The method further including determining a location of the target object within a geographical area independently of calculating the pose of the camera based on map data for the geographical area. The method further includes estimating a position of a user of the camera within the geographical area based on the location of the target object and the pose of the camera.

An example system for estimating camera pose includes: a camera configured to capture an image of a location including a target object; an edge extractor configured to detect edge line features outside of the target object within the image; and a camera pose calculator configured to calculate a pose of the camera with respect to the target object based on the edge line features.

Implementations of such a system may include one or more of the following features. The system further includes a vanishing point estimator configured to estimate one or more vanishing points associated with the edge line features, where the camera pose calculator is further configured to calculate the pose of the camera based on the vanishing points. The edge line features comprise horizontal edge line features and vertical edge line features. The edge line features correspond to at least one of a floor, a roof, or a door. The vanishing point estimator is further configured to perform at least one of estimating a horizontal vanishing point from the horizontal edge line features or to estimate a vertical vanishing point from the vertical edge line features. The vanishing point estimator is configured to estimate one vanishing point, and the camera pose calculator is further configured to estimate rotation of the camera with respect to a plane, defined by a detectable target in the image, from a set of discrete rotation states based on the one estimated vanishing point. The vanishing point estimator is configured to estimate two or more vanishing points, and the camera pose calculator is further configured to calculate the pose of the camera as at least one of pan, tilt, or roll with respect to a plane, defined by a detectable target in the image, based on the two or more vanishing points. The camera pose calculator is configured to calculate roll, pan, and tilt to calculate the pose of the camera. The system further includes an orientation sensor coupled to the camera, where the camera pose calculator is further configured to obtain information relating to at least one of the tilt or the pan from the orientation sensor. The camera pose calculator is further configured to determine the roll based at least in part on the tilt.

Also or alternatively, implementations of such a system may include one or more of the following features. The system further includes a point of interest (POI) detector configured to determine a location of the target object within a geographical area independently of the camera pose calculator based on map data for the geographical area. The system further includes a positioning engine configured to estimate a position of a user of the camera within the geographical area based on the location of the target object and the pose of the camera.

Another example system for estimating camera pose includes: means for capturing an image of a location, where the image includes a target object; means for detecting edge line features outside of the target object within the image; and means for calculating a pose of the means for capturing with respect to the target object based on the edge line features.

Implementations of such a system may include one or more of the following features. The system further includes means for estimating one or more vanishing points associated with the edge line features, wherein the means for calculating comprises means for calculating the pose of the means for capturing based on the vanishing points. The means for detecting the edge line features comprises means for detecting horizontal edge line features and vertical edge line features. The means for detecting the edge line features comprises means for detecting at least one of a floor, a roof, or a door. The means for estimating the one or more vanishing points comprises at least one of means for estimating a horizontal vanishing point from the horizontal edge line features or means for estimating a vertical vanishing point from the vertical edge line features. The means for estimating the one or more vanishing points comprises means for estimating one vanishing point, and the means for calculating the pose of the means for capturing comprises means for estimating rotation of the means for capturing with respect to a plane, defined by a detectable target in the image, from a set of discrete rotation states based on the one estimated vanishing point. The means for estimating the one or more vanishing points comprises means for estimating two or more vanishing points, and the means for calculating the pose of the means for capturing comprises means for calculating the pose of the means for capturing as at least one of pan, tilt, or roll with respect to a plane, defined by a detectable target in the image, based on the two or more vanishing points. The means for calculating the pose of the means for capturing comprises means for calculating the pose of the means for capturing as roll, pan, and tilt. The system further including means for obtaining information relating to at least one of the tilt or the pan from an orientation sensor coupled to the means for capturing. The system further including means for determining the roll based at least in part on the tilt.

An example processor-readable storage medium includes processor-executable instructions configured to cause a processor to: obtain an image of a location captured via a camera, where the image includes a target object and edge line features outside the target object; and calculate a pose of the camera with respect to the target object based on the edge line features. The processor-readable storage medium may include instructions configured to cause the processor to: estimate one or more vanishing points associated with the edge line features; and calculate the pose of the camera based on the vanishing points.

An example method includes: detecting a target based at least in part on key points in an image of the target, where the image is captured at a device; and estimating a pose of the device based at least in part on information peripheral to the target in the image. The information may comprise edge lines of a building structure, and the estimating may comprise determining a vanishing point based at least in part on the edge lines.

Another example method includes: determining an approximate position of a mobile device based at least in part on information detectable at the mobile device; and refining the approximate position of the mobile device based at least in part on structural edge lines observable at the mobile device.

Implementations of such a method may include one or more of the following features. The information comprises visual data, and the approximate position is determined based on an image of the visual data captured by the mobile device. The information comprises wireless signals, and the approximate position is determined based on a heatmap of the wireless signals or a signature of the wireless signals. The refining comprises determining a pose of the mobile device based at least in part on the structural edge lines. The pose is determined based on an image of the structural edge lines captured by the mobile device.

Another example method includes: obtaining an image of a location captured via a camera, where the image includes a target object and line features; estimating one or more vanishing points associated with the line features; and calculating a pose of the camera with respect to the target object based on the estimated vanishing points.

Implementations of such a method may include one or more of the following techniques. The target object comprises the line features. The line features are disposed outside of the target object. The target object comprises at least one of the line features and at least one of the line features is disposed outside of the target object. The estimating comprises estimating only one vanishing point. The estimating comprises estimating at least two vanishing points.

Another example method includes: obtaining an image of a location captured via a camera, where the image includes a target object and line features; and estimating a direction in which the camera is facing with respect to a map of the location based on the target object and the line features.

Implementations of such a method may include one or more of the following features. The target object comprises the line features. The line features are disposed outside of the target object.

Items and/or techniques described herein may provide one or more of the following capabilities, as well as other capabilities not mentioned. Robust estimation of camera pose in a two-dimensional map may be determined, e.g., when a quantity and/or placement of key points are insufficient for pose estimation using prior techniques. Camera rotation may be estimated using one or more horizontal vanishing points. Estimations may be performed in spite of imperfections in lines analyzed. Positioning, e.g., of a mobile device, accuracy may be improved. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

DETAILED DESCRIPTION

Described herein are systems and methods for estimating camera pose or heading relating to an image of an object. While various embodiments are described herein in the context of a landmark-based indoor positioning system, the systems and methods described herein can be extended more generally to any scenario in which the camera pose or heading is desirably estimated with respect to an object appearing in an image captured by a corresponding camera. The object(s) utilized in the positioning, and/or an associated user location, may be inside or outside. In some embodiments, the camera pose or heading may be estimated with respect to a location of the camera estimated from information other than an object appearing in an image. For example, an initial estimated user location may be obtained using measurements from a satellite positioning system and/or network measurements (e.g., by comparing heatmap or signature data, etc.). This initial estimate can then be refined based on a captured image and detected edge line features in the image, as described herein.

Figure 1:
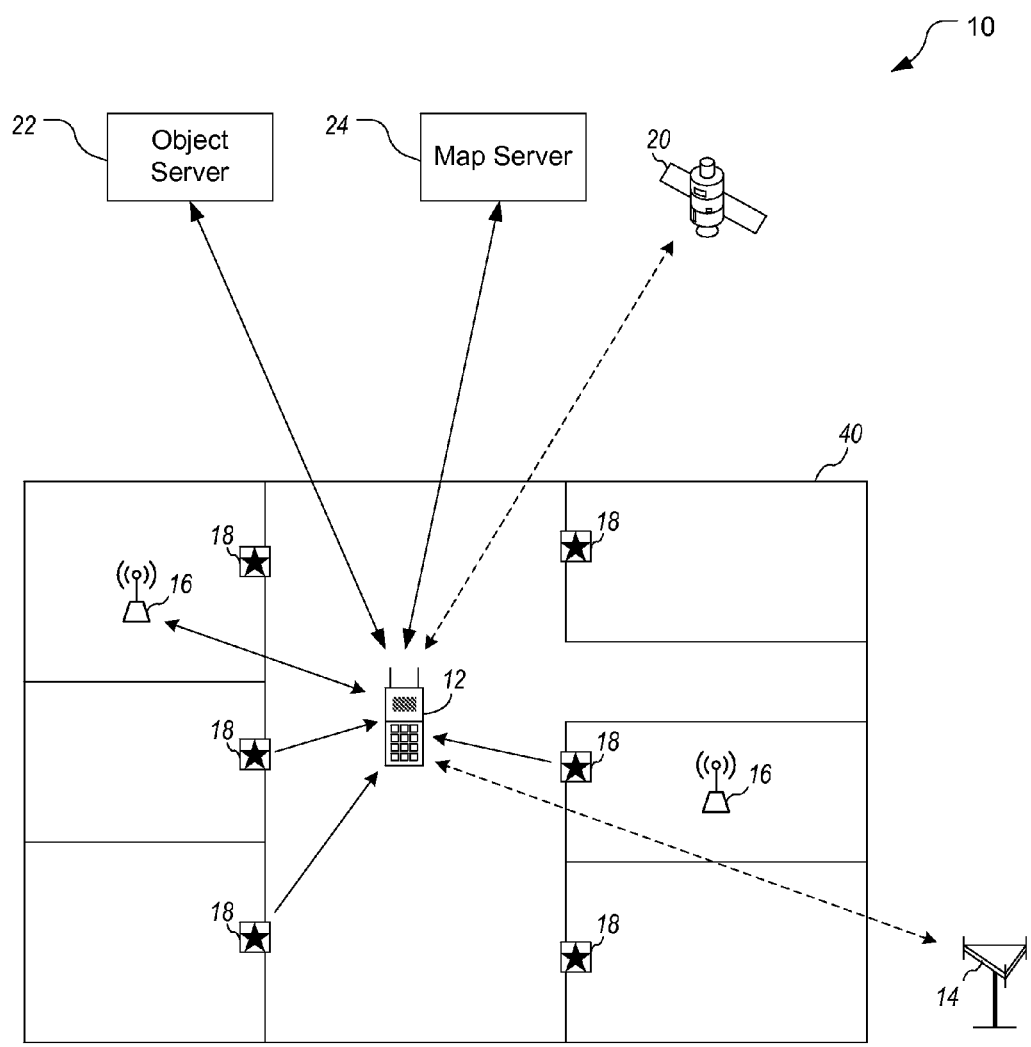
FIG. 1 is a schematic diagram of a wireless telecommunication system.

Systems and methods described herein operate via one or more mobile devices operating in a wireless communication system. Referring to FIG. 1, a wireless communication system 10 includes one or more base transceiver stations (BTSs), here one BTS 14, and wireless access points (APs) 16. The BTS 14 and APs 16 provide communication service for a variety of wireless communication devices, referred to herein as mobile devices 12. Wireless communication devices served by a BTS 14 and/or AP 16 can include, but are not limited to, personal digital assistants (PDAs), smartphones, computing devices such as laptops, desktops or tablet computers, automobile computing systems, etc., whether presently existing or developed in the future.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTS 14 and APs 16 can wirelessly communicate with the mobile devices 12 in the system 10 via antennas. A BTS 14 may also be referred to as a base station, a Node B, an evolved Node B (eNB), etc. The APs 16 may also be referred to as access nodes (ANs), hotspots, etc. The BTS 14 is configured to communicate with mobile devices 12 via multiple carriers. The BTS 14 can provide communication coverage for a respective geographic area, such as a cell. The cell of the BTS 14 can be partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

As further shown in system 10, the mobile device 12 is positioned within an area 40, such as a shopping mall (in the example shown in FIG. 1), a school, or other indoor area or outdoor area, which may be identified or a portion thereof identified by a location context identifier (LCI). The APs 16 are positioned within the area 40 and provide communication coverage for respective areas (rooms, stores, etc.) of the area 40. Access to an AP 16 in the system 10 can be open, or alternatively access can be secured with a password, encryption key or other credentials.

The mobile devices 12 can be dispersed throughout the system 10. The mobile devices 12 may be referred to as terminals, access terminals (ATs), mobile stations, user equipment (UE), subscriber units, etc. The mobile devices 12 can include various devices as listed above and/or any other devices.

As further shown in FIG. 1, a mobile device 12 may receive navigation signals from a satellite positioning system (SPS), e.g., through SPS satellites 20. The SPS satellites 20 can be associated with a single multiple global navigation satellite system (GNSS) or multiple such systems. A GNSS associated with satellites 20 can include, but are not limited to, Global Positioning System (GPS), Galileo, Glonass, Beidou (Compass), etc. SPS satellites 20 are also referred to as satellites, space vehicles (SVs), etc.

As discussed above, the wireless communication system 10 may include one or more base transceiver stations (BTSs). Thus, the system 10 may comprise a greater or fewer number of BTSs than illustrated in FIG. 1. In some embodiments, the mobile device 12 communicates only with one or more satellites 20, for example when there are no BTSs or when the BTSs are out of range. In other embodiments, the mobile station 12 does not communicate with any satellites 20, for example when a signal from the satellite 20 cannot be accurately received and/or when there are one or more BTSs in the system 10.

A mobile device 12 within the system 10 can estimate its current position within the system 10 using various techniques, based on other communication entities within view and/or information available to the mobile device 12. For instance, a mobile device 12 can estimate its position using information obtained from APs 16 associated with one or more wireless local area networks (LANs), personal area networks (PANs) utilizing a networking technology such as Bluetooth or ZigBee, etc., SPS satellites 20, and/or map constraint data obtained from a map server 24 or area server, as well as additional information as described in further detail below.

As a further example, the mobile device 12 can visually estimate its position relative to the known positions of various landmarks 18, such as storefront logos or other markers, positioned within the area 40. As shown by system 10, the mobile device 12 captures images (via a camera) of various landmarks 18 within view of the mobile device 12. Based on these images, the mobile device 12 can estimate its location using various techniques. For instance, the mobile device 12 can communicate with an object server 22 to identify the landmarks 18 and determine their locations. For a given indoor area, the mobile device 12 may also determine the locations of the landmarks 18 based on a map of the area. The map, or portions thereof, can be stored in advance by the mobile device 12 and/or obtained on demand from a map server 24 or another entity within the system 10. Based on the locations of the landmarks 18, as well as other information obtained from the BTS 14, APs 16, or the mobile device 12 itself, the mobile device 12 estimates its position within the area 40. As another example, an image of one or more landmarks 18 captured by the mobile device 12 can be analyzed to estimate the pose or heading of the landmarks 18 within the image. This estimated pose or heading, combined with the identity of the relevant landmarks 18 as provided via communication with the object server 22, user input, or other mechanisms, is used to estimate the direction and rough location of the mobile device 12 with respect to the landmarks 18. This information can be combined with the determined locations of the landmarks and/or other obtained information to estimate the location of the mobile device 12.

Figure 2:
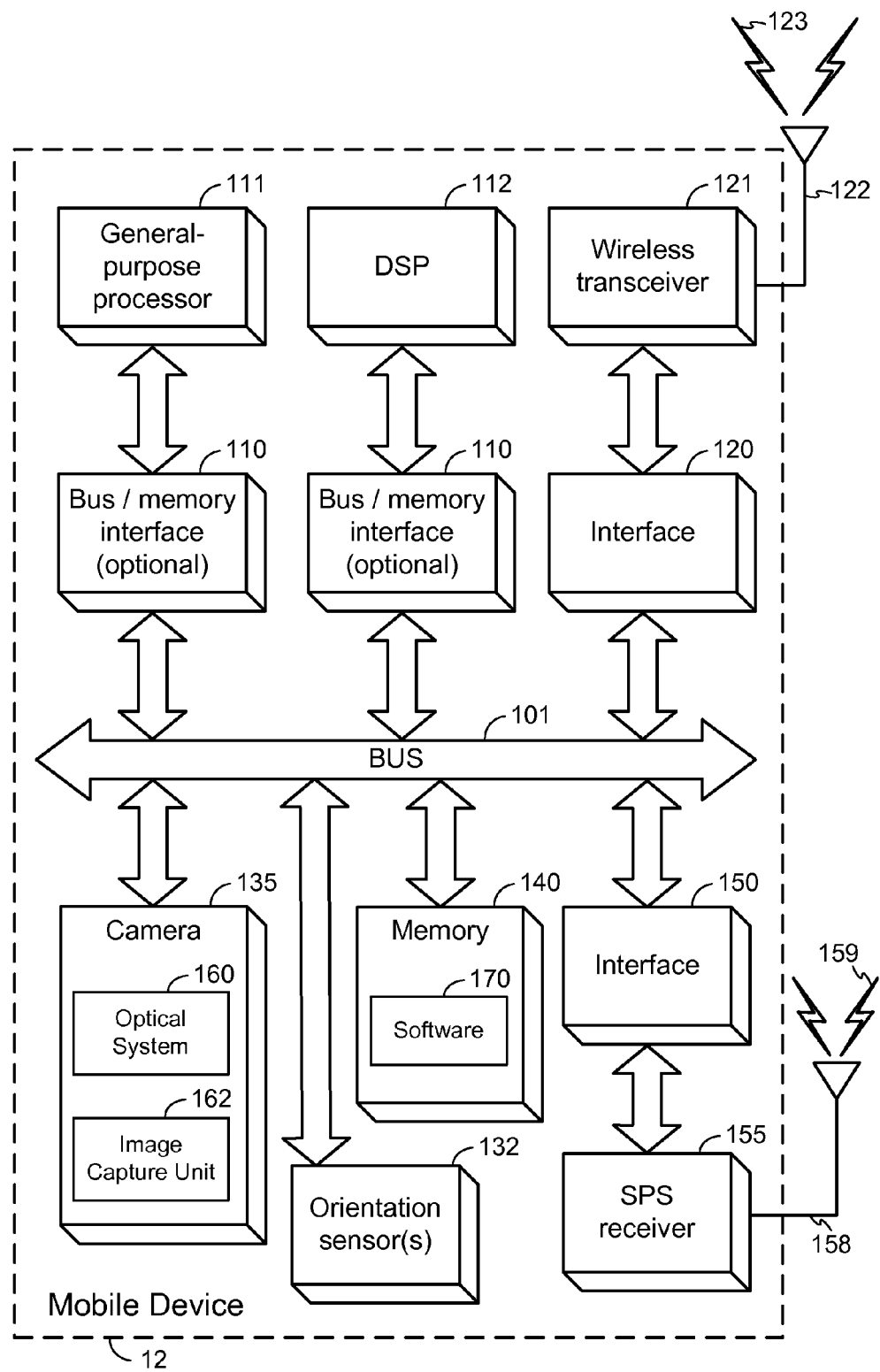
FIG. 2 is a block diagram of components of one embodiment of a mobile station shown in FIG. 1.

Referring next to FIG. 2, an example one of the mobile devices 12 includes a wireless transceiver 121 that sends and receives wireless signals 123 via a wireless antenna 122 over a wireless network. The wireless transceiver 121 is connected to a bus 101 by a wireless transceiver bus interface 120. While shown as distinct components in FIG. 2, the wireless transceiver bus interface 120 may also be a part of the wireless transceiver 121. Here, the mobile device 12 is illustrated as having a single wireless transceiver 121. However, a mobile device 12 can alternatively have multiple wireless transceivers 121 and wireless antennas 122 to support multiple communication standards such as WiFi, CDMA, Wideband CDMA (WCDMA), Long Term Evolution (LTE), Bluetooth, etc.

The mobile device 12 further includes an orientation sensor or sensors 132 connected to the bus 101. The orientation sensor(s) 132 is configured to provide indications of an orientation of the mobile device 12 and may include, e.g., one or more accelerometers, gyroscopes, and/or magnetometers.

The mobile device 12 also includes an SPS receiver 155 that receives SPS signals 159 (e.g., from SPS satellites 20) via an SPS antenna 158. The SPS receiver 155 processes, in whole or in part, the SPS signals 159 and uses these SPS signals 159 to determine the location of the mobile device 12. A general-purpose processor 111, memory 140, DSP 112 and/or specialized processor(s) (not shown) may also be utilized to process the SPS signals 159, in whole or in part, and/or to calculate the location of the mobile device 12, in conjunction with SPS receiver 155. Storage of information from the SPS signals 159 or other location signals is performed using a memory 140 or registers (not shown). While only one general purpose processor 111, one DSP 112 and one memory 140 are shown in FIG. 2, more than one of any, a pair, or all of these components could be used by the mobile device 12.

The general purpose processor 111 and DSP 112 associated with the mobile device 12 are connected to the bus 101, either directly or by a bus interface 110. Additionally, the memory 140 associated with the mobile device 12 is connected to the bus 101 either directly or by a bus interface (not shown). The bus interfaces 110, when implemented, can be integrated with or independent of the general-purpose processor 111, DSP 112 and/or memory 140 with which they are associated.

The memory 140 can include a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by general-purpose processor(s) 111, specialized processors, or DSP(s) 112. Thus, the memory 140 is a processor-readable memory and/or a computer-readable memory that stores software 170 (programming code, instructions, etc.) configured to cause the processor(s) 111 and/or DSP(s) 112 to perform the functions described. Alternatively, one or more functions of the mobile device 12 may be performed in whole or in part in hardware.

The mobile device 12 further includes a camera 135 that captures images and/or video in the vicinity of the mobile device 12. The camera 135 includes an optical system 160 including one or more lenses, which collectively define a field of view of the camera 135 from which images are captured. Lenses and/or other components of the optical system 160 can be housed within the mobile device 12 and/or external to the mobile device 12, e.g., as lens attachments or the like. The optical system 160 is communicatively coupled with an image capture unit 162. The image capture unit 162 includes a charge-coupled device (CCD), a complementary metal-oxide-semiconductor (CMOS) device, and/or other technology to convert optical images into electrical information that is transferred to one or more processing entities of the mobile device 12, such as the general-purpose processor 111 and/or the DSP 112. In some embodiments, the image capture unit 162 is configured to capture energy outside of the visible spectrum, for example infrared (IR) light. The mobile device may further include an emitter, for example a visible flash and/or an IR emitter.

While the mobile device 12 here includes one camera 135, multiple cameras 135 could be used, such as a front-facing camera disposed along a front side of the mobile device 12 and a back-facing camera disposed along a back side of the mobile device 12, which can operate interdependently or independently of one another. The camera 135 is connected to the bus 101, either independently or through a bus interface 110. For instance, the camera 135 can communicate with the DSP 112 through the bus 101 in order to process images captured by the image capture unit 162 in the event that the camera 135 does not have an independent image processor. In addition, the camera 135 may be associated with other components not shown in FIG. 2, such as a microphone for capturing audio associated with a given captured video segment, sensors configured to detect the directionality or attitude of the image, etc. The camera 135 can additionally communicate with the general-purpose processor(s) 111 and/or memory 140 to generate or otherwise obtain metadata associated with captured images or video. Metadata associated with, or linked to, an image contains information regarding various characteristics of the image. For instance, metadata includes a time, date and/or location at which an image is captured, image dimensions or resolution, an identity of the camera 135 and/or mobile device 12 used to capture the image, etc. Metadata utilized by the cameras 135 are generated and/or stored in a suitable format, such as exchangeable image file format (EXIF) tags or the like. The camera 135 can also communicate with the wireless transceiver 121 to facilitate transmission of images or video captured by the camera 135 to one or more other entities within an associated communication network.

While the mobile device 12 is shown in FIG. 2 with each of the components described above, one or more of the illustrated and described components may, in some embodiments, be omitted from the mobile device 12. For example, one or more of the elements 120-123 and/or 150, 155, 158, 159 may be omitted in some embodiments. Further, some or all of the functionality or processing described herein may be performed by the mobile device 12 as shown in FIG. 2 and/or described above or by devices or components separate from the mobile device 12. For example, a picture or other information captured at the mobile device 12 may be transmitted to a server for processing. The server may then estimate the camera pose based on the received information, and in some embodiments the estimated pose may be transmitted back to the mobile device 12. In some embodiments, the server may include elements described and/or illustrated with respect to the mobile device 12 which are configured to estimate the camera pose and/or receive and/or transmit information.

Figure 3:
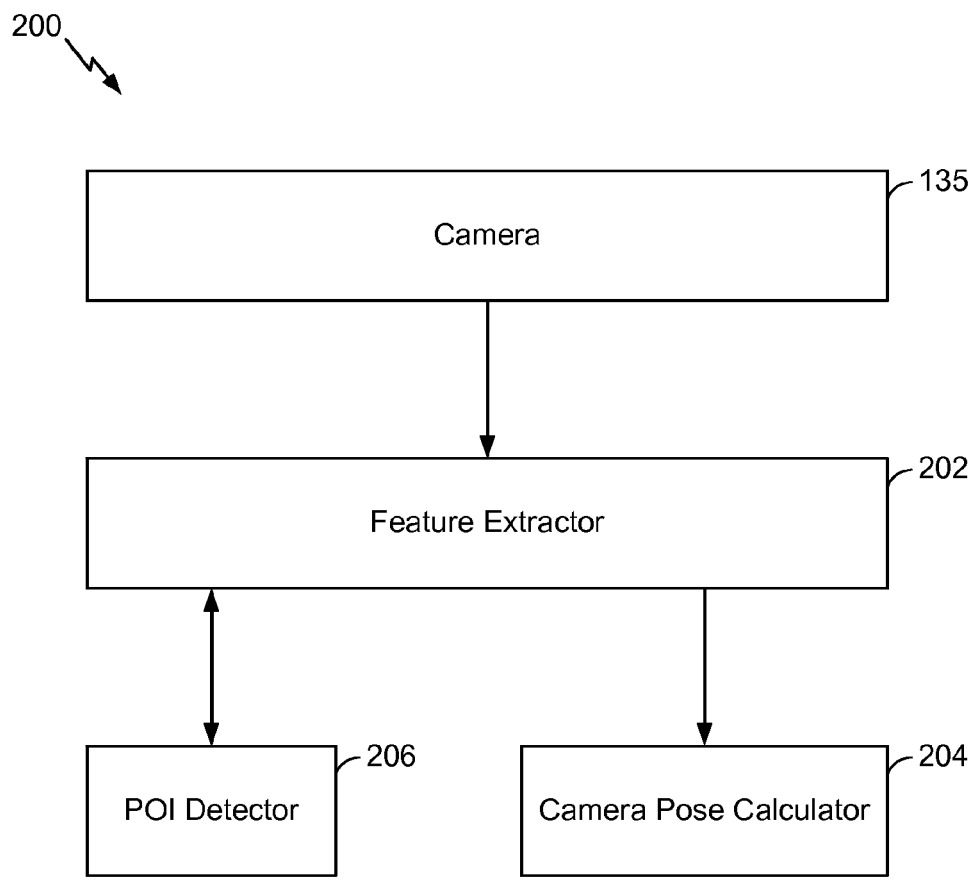
FIG. 3 is a block diagram of a system for estimating camera pose based on peripheral information.

Referring next to FIG. 3, a system 200 for estimating camera pose based on peripheral information includes a camera 135, a feature extractor 202, a camera pose calculator 204 and a point of interest (POI) detector 206. The feature extractor 202, camera pose calculator 204 and POI detector 206 can be implemented in hardware (e.g., in the processor 111 or in another processor or hardware element), in software (e.g., as computer-executable code stored as software 170 on the memory 140 and executed by the general-purpose processor 111), or a combination of hardware and software. The feature extractor 202 receives an image captured by the camera 135 and extracts key points and/or other image features associated with the image. These features are utilized by the camera pose calculator 204 to determine the approximate camera pose or heading associated with the image, as described below.

The POI detector 206 leverages one or more sources of information to detect POIs or other objects within a captured image. For instance, the POI detector 206 may utilize features extracted from the feature extractor 202 to detect objects within the image. Alternatively, identities and/or locations of objects within a given image may be provided a priori to the POI detector 206, e.g., as user input. In this case, the POI detector 206 may assist the feature extractor 202 in identifying image features corresponding to the object and/or peripheral image features within the image.

In the case of a visual recognition technique, such as that employed for vision-based positioning in a shopping mall, the POI detector 206 compares a test image (e.g., a storefront image) against a set of known reference images to detect a POI. The reference image may be a standalone image, or alternatively the reference image may relate more generally to a set of known brand-specific visual signatures (VSs) corresponding to logos, standard storefronts, etc. Detection is generally performed using computer vision techniques, such as scale-invariant feature transform (SIFT) algorithms or the like. Although these techniques provide adequate results for detecting POIs, performing pose or camera heading estimation based on the key points obtained via these techniques is challenging for a variety of reasons. For instance, the detected target may occupy a small region in the test image, the number of key points may not be sufficient to allow robust random sample consensus (RANSAC) for camera pose estimation, the positions of the key points may be collinear along one rotation axis, other difficulties. This differs from a typical augmented reality (AR) use case, in which images utilized for pose estimation contain a large number of key points that are well distributed within the image and target objects generally display a large amount of texture detail. Because images captured in the context of an indoor positioning application or the like generally have fewer key points that are concentrated in the middle of the target and not widely distributed within the image, pose estimation for these images presents a higher degree of difficulty and complexity.

Here, the camera pose calculator 204 is configured to estimate the camera pose using an image from the camera 135. The image may have few and localized object key points (e.g., key points associated with a detected object within a small portion of the image, etc.), and the pose calculator 204 may estimate the camera pose by using peripheral information around the object. In doing so, operation of the POI detector 206 is decoupled from operation of the camera pose calculator 204. Thus, the POI detector 206 is configured to detect a POI (or other image target such as a store front logo) within an image based on computer vision techniques, while the camera pose calculator 204 is configured to calculate the camera pose associated with the image based on information such as lines and edges from building structures or the like. Pose calculation may be performed by the camera pose calculator 204 independently of operation of the POI detector 206, such that the camera pose calculator 204 does not utilize any information derived from the POI detector 206 in determining the camera pose associated with a given image, and vice versa. In other embodiments, the POI detector 206 and the camera pose calculator 204 may be implemented together and/or the camera pose calculator 204 may utilize any information derived from the POI detector 206 in determining the camera pose associated with a given image, and vice versa.

Figure 4:
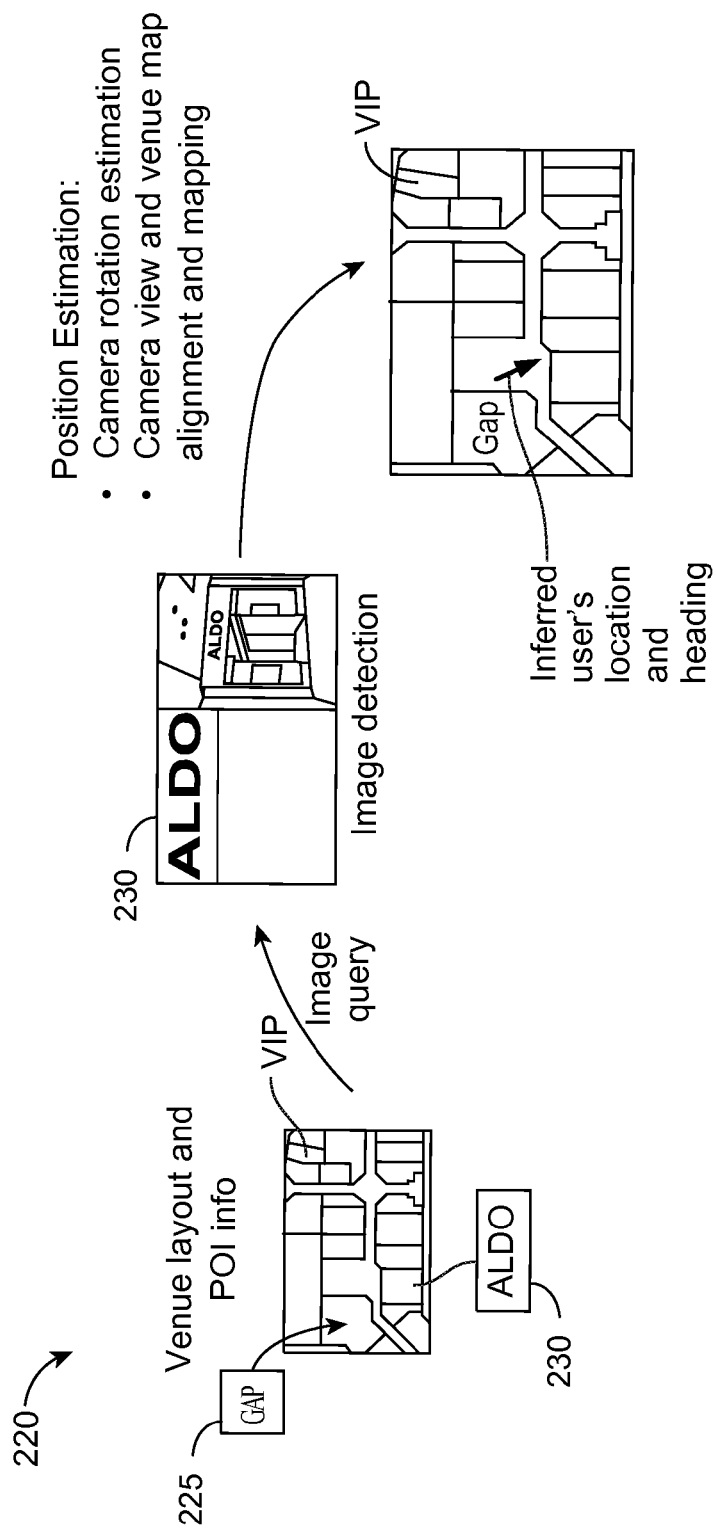
FIG. 4 is an illustrative view of an application of the system shown in FIG. 3 for vision-based indoor positioning.

Diagram 220 in FIG. 4 illustrates an example implementation of the system 200 for a vision-based indoor positioning system. As shown in diagram 220, a storefront in view of a camera 135 held by a user is detected as a visual cue for a position or location service. Assuming the user faces the same direction as the camera, the user's heading on a 2D map is inferred based on the camera rotation angle against the wall of the storefront. This angle can also be used to refine the possible location of the user within an associated area. In the example shown in FIG. 4, a GAP® store and an ALDO® store are at a venue. A logo 225 is disposed at the front of the GAP store, and a logo 230 is disposed at a front of the ALDO store.

Figure 5:
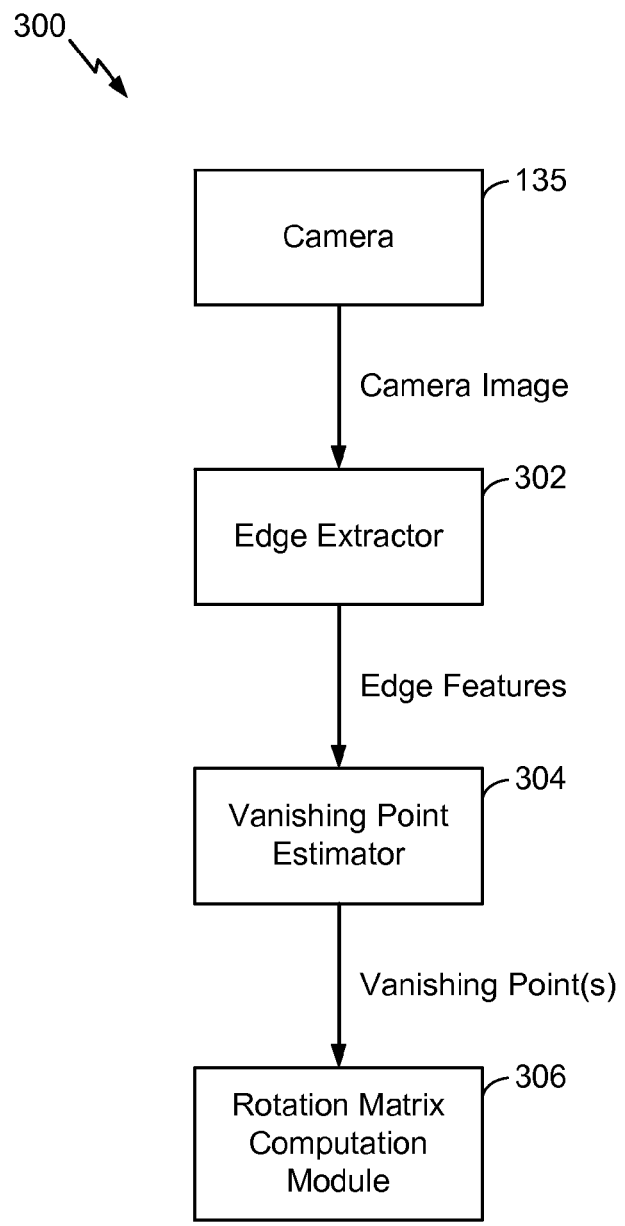
FIG. 5 is a block diagram of a system for estimating a rotation matrix associated with an image based on converging edges detected within the image.

FIG. 5 illustrates a system 300 for estimating a rotation matrix associated with an image based on converging edge lines detected within the image. The system 300 includes the camera 135, an edge extractor 302, a vanishing point estimator 304 and a rotation matrix estimation module 306. The edge extractor, vanishing point estimator 304 and rotation matrix computation module 306 may be implemented as hardware, software, or a combination of hardware or software. The system 300 may be implemented as sub-components of the system 200; for example, the edge extractor 302 may be at least partially implemented by the feature extractor 202 and the vanishing point estimator 304 and rotation matrix estimation module 306 may be at least partially implemented by the camera pose calculator 204.

Given an image from the camera 135, the system 300 computes a homography corresponding to the image, e.g., in the form of a rotation matrix associated with the camera with respect to one or more objects in the image. Precise computation of the rotation matrix can be performed if intrinsic parameters of the cameras used to capture a reference image and/or test image are known. However, computation of the rotation matrix becomes more difficult if these camera parameters are not known. Here, the rotation matrix estimation module 306 provides an estimate of the camera rotation with respect to surfaces in a captured image with varying degrees of accuracy based on peripheral features, such as edge features, identified within the image.

As described above, camera pose estimation as performed by system 300 can be performed independently of object or POI detection. For instance, if the camera 135 is pointed at a storefront, the system 300 can determine a heading angle between the camera and the storefront without knowledge of the identity of the particular storefront. The camera pose estimation, once complete, may be combined with information relating to POIs within view of the camera to provide an estimate of the location of the camera 135 within an area. The POIs within view of the camera may be provided as user input and/or detected through one or more computer vision algorithms. Further, the particular locations of the POIs within a given image may be specified or unspecified without affecting the camera pose estimation performed by system 300.

Figure 6A:
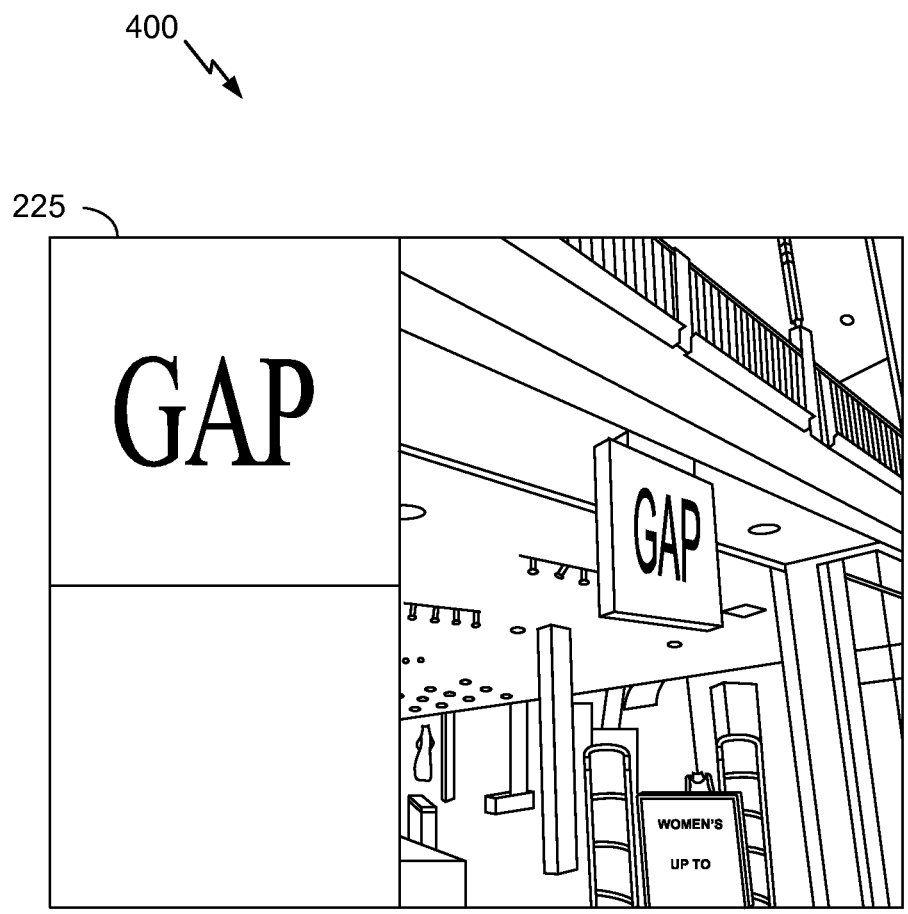
FIGS. 6A-6B are example images utilized for camera pose estimation as described herein.
Figure 6B:
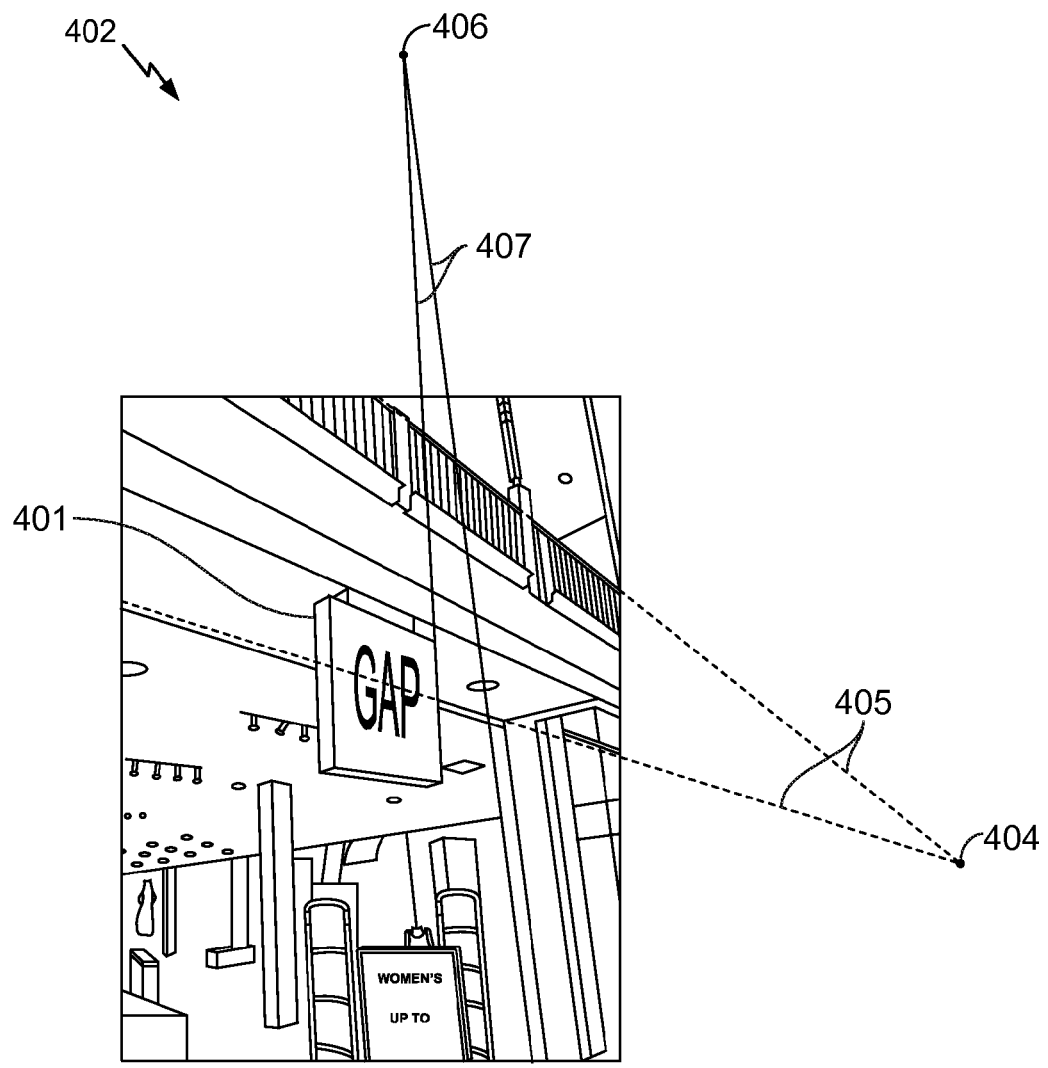

Referring to FIGS. 6A-6B, images 400, 402 illustrate an example location for which camera pose estimation can be performed. While images 400, 402 illustrate a storefront location, the techniques described herein could be applied for any suitable location. For example, the techniques described herein may be applied when a detectable target in the image (e.g., a brand logo provided on a storefront, etc.) is placed on a wall of the location or in a plane that is parallel to the wall, as shown by a store logo 401 in image 402; when the detectable target is on a planar surface or on parallel planar surfaces, and the camera angle (tilting and rolling) is the angle between the plane of the detectable target of the location and the plane of the camera image; and/or when the structure of the location has a known or common layout, for example a Manhattan layout, e.g., such that all edge lines have a fully horizontal or vertical orientation. The logo 225 for the GAP store is the appearance of the GAP logo if viewed from straight on, i.e., perpendicular to a sign displaying the logo 225.

Given a structure that corresponds to the above assumptions, the system 300 infers the camera rotation angle based on the edge lines around a location within an image. These edge lines can include the edges of the roof, the floor, doors, and other edge line features. The edge lines within a given image captured by the camera are extracted (detected) by the edge extractor 302. From these edge lines, the vanishing point estimator 304 attempts to determine one or more vanishing points for parallel edge lines depicted within the image. An example vanishing point is a horizontal vanishing point 404 of some of the edge lines in the image 402. Thus, after POI detection, instead of using key points from the POI (e.g., the store logo in images 400, 402) for pose estimation, the rotation matrix estimation module 306 uses the edges of the roof, floor and doors around the detected POI to infer the camera rotation angle.

The rotation matrix estimation module 306 can derive the rotation matrix corresponding to an image from vanishing points associated with the image as follows. For a pinhole camera, a perspective projection from a Euclidean 3D space to an image can be represented in homogenous coordinates with a rotation component R and translation component T as follows:

$$\lambda_i \begin{bmatrix} u_i \\ v_i \\ 1 \end{bmatrix} = K[R\ T] \begin{bmatrix} X_i \\ Y_i \\ Z_i \\ 1 \end{bmatrix} \quad K = \begin{bmatrix} \alpha_u & s & u_0 \\ 0 & \alpha_v & v_0 \\ 0 & 0 & 1 \end{bmatrix}$$

$$R = R_{pan} * R_{tilt} * R_{roll}$$

Figure 7:
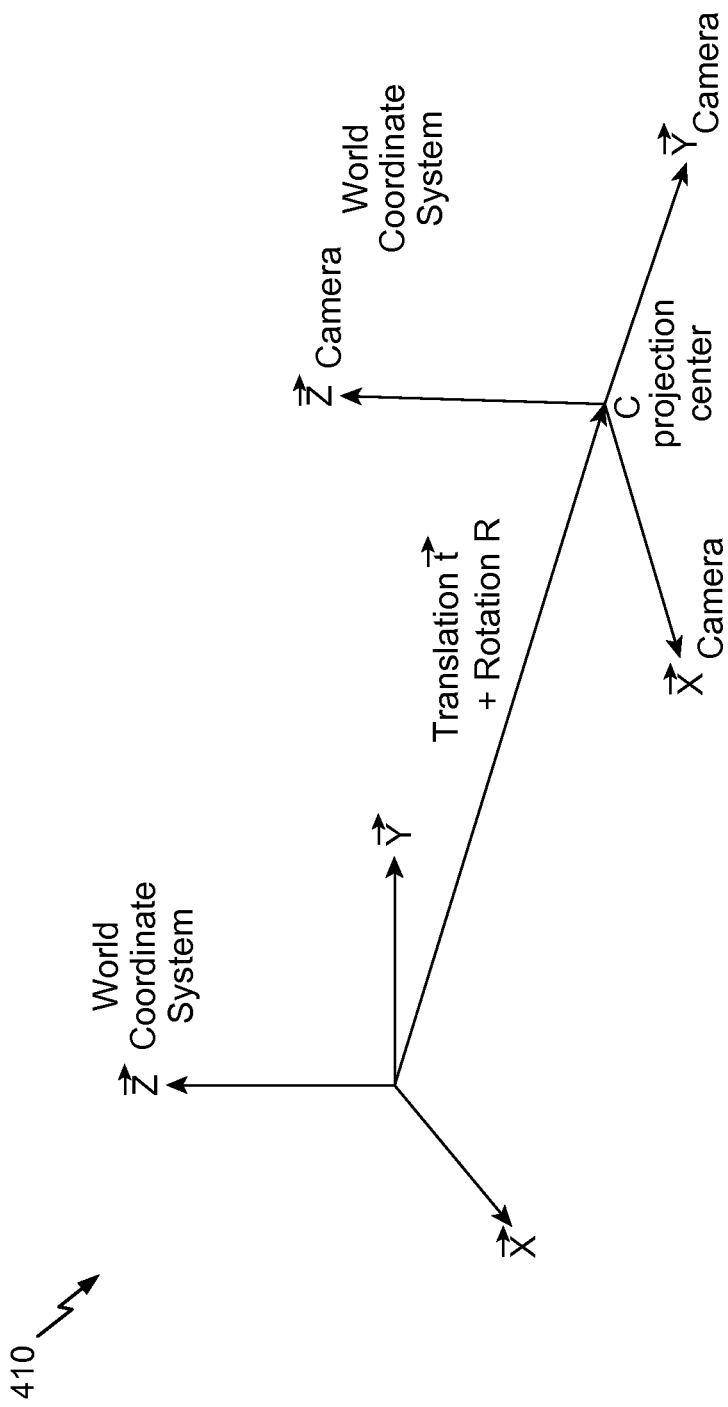
FIG. 7 is an illustrative view of a coordinate transformation utilized by the camera pose estimation techniques described herein.

In the above equations, $\lambda_i$ is a scaling factor, $(u_i, v_i)$ are the 2D image coordinates of locations within the image, $(X_i, Y_i, Z_i)$ are the 3D real-world coordinates of these locations, and K and its components are a matrix of camera-specific parameters. The above coordinate transformation is illustrated by diagram 410 in FIG. 7.

As additionally noted in the above, R is the rotation angle of the camera with respect to the image. R is defined with pan, tilt and roll parameters, which are defined as follows:

Roll: The orientation in the y-z plane is given by the rotation roll around the x-axis. Here, the roll $R_{roll}$ is given by $$\begin{bmatrix} 1 & 0 & 0 \\ 0 & \cos(roll) & -\sin(roll) \\ 0 & \sin(roll) & \cos(roll) \end{bmatrix}.$$

Tilt: The orientation in the x-z plane is given by the rotation tilt around the y-axis. Here, the tilt $R_{tilt}$ is given by $$\begin{bmatrix} \cos(tilt) & 0 & \sin(tilt) \\ 0 & 1 & 0 \\ -\sin(tilt) & 0 & \cos(tilt) \end{bmatrix}.$$

Pan: The orientation in the x-y plane is given by the rotation pan around the z-axis. Here, the pan $R_{pan}$ is given by $$\begin{bmatrix} \cos(pan) & -\sin(pan) & 0 \\ \sin(pan) & \cos(pan) & 0 \\ 0 & 0 & 1 \end{bmatrix}.$$

From these definitions, R can be expressed as follows:

$$R = \begin{pmatrix} \cos(pan)\cos(tilt) & \cos(pan)\sin(tilt)\sin(roll) - \sin(pan)\cos(roll) & \cos(pan)\sin(tilt)\cos(roll) + \sin(pan)\sin(roll) \\ \sin(pan)\cos(tilt) & \sin(pan)\sin(tilt)\sin(roll) + \cos(pan)\cos(roll) & \sin(pan)\sin(tilt)\cos(roll) - \cos(pan)\sin(roll) \\ -\sin(tilt) & \cos(tilt)\sin(roll) & \cos(tilt)\cos(roll) \end{pmatrix}$$

The vanishing points detected within the image are defined to be along the three orthogonal directions. Here, an image is defined as having three vanishing points: $(u_1, v_1)$ on the x-axis, $(u_2, v_2)$ on the y-axis, and $(u_3, v_3)$ on the depth or z-axis. For these vanishing points, the following is derived:

$$\begin{bmatrix} \lambda_1 u_1 & \lambda_2 u_2 & \lambda_3 u_3 \\ \lambda_1 v_1 & \lambda_2 v_2 & \lambda_3 v_3 \\ \lambda_1 & \lambda_2 & \lambda_3 \end{bmatrix} = K[R\ T] \begin{bmatrix} 1 & 0 & 0 \\ 0 & 1 & 0 \\ 0 & 0 & 1 \\ 0 & 0 & 0 \end{bmatrix}$$

Assuming that the camera has square pixels and zero skew, and based on the definition of $\lambda_i$ as arbitrary scale factors, the following is further derived:

$$\begin{bmatrix} \lambda_1 u_1 & \lambda_2 u_2 & \lambda_3 u_3 \\ \lambda_1 v_1 & \lambda_2 v_2 & \lambda_3 v_3 \\ \lambda_1 & \lambda_2 & \lambda_3 \end{bmatrix} = \begin{bmatrix} \alpha & 0 & u_0 \\ 0 & \alpha & v_0 \\ 0 & 0 & 1 \end{bmatrix} R$$

From the above equation, the rotation angle R is derived according to the following:

$$R = \begin{bmatrix} \lambda_1(u_1 - u_0)/\alpha & \lambda_2(u_2 - u_0)/\alpha & \lambda_3(u_3 - u_0)/\alpha \\ \lambda_1(v_1 - v_0)/\alpha & \lambda_2(v_2 - v_0)/\alpha & \lambda_3(v_3 - v_0)/\alpha \\ \lambda_1 & \lambda_2 & \lambda_3 \end{bmatrix}$$

In the above, R additionally corresponds to the matrix R=[r1 r2 r3], where each of the components r1, r2, r3 correspond to a column of R. From this representation of R, the rotation matrix and associated rotation angle can be estimated given three vanishing points $(u_1, v_1)$, $(u_2, v_2)$, $(u_3, v_3)$. The parameters for i=1, 2, 3 are chosen to make each column of R of unit norm.

From the above, a precise computation of the camera rotation angle, pan, tilt and roll can be calculated given two vanishing points identified within an image. For instance, referring back to the image 402 in FIG. 6B, calculations can be performed with respect to the horizontal vanishing point 404 of horizontal lines 405 converging to the right of the image 402 and a vertical vanishing point 406 of vertical lines 407 converging above the image 402. Depending on edge line features within the image, a second horizontal vanishing point could also be identified and used. As the 3D coordinate axes (x, y, z and u, v, depth in the image) are perpendicular, if two vanishing points are known the location of the third vanishing point can be computed based on the known vanishing points, e.g., r3=r1×r2.

For normalization of the rotation matrix, the following definition is made:

$$\sum_{j=1}^{3} R^2(i, j) = 1$$

For images where the camera's horizontal axis is held parallel to the ground, pan=0. In this case, R can be simplified as follows:

$$R = \begin{bmatrix} \cos(tilt) & \sin(tilt)\sin(roll) & \sin(tilt)\cos(roll) \\ 0 & \cos(roll) & \sin(roll) \\ -\sin(tilt) & \cos(tilt)\sin(roll) & \cos(tilt)\cos(roll) \end{bmatrix}$$

Figure 8A:
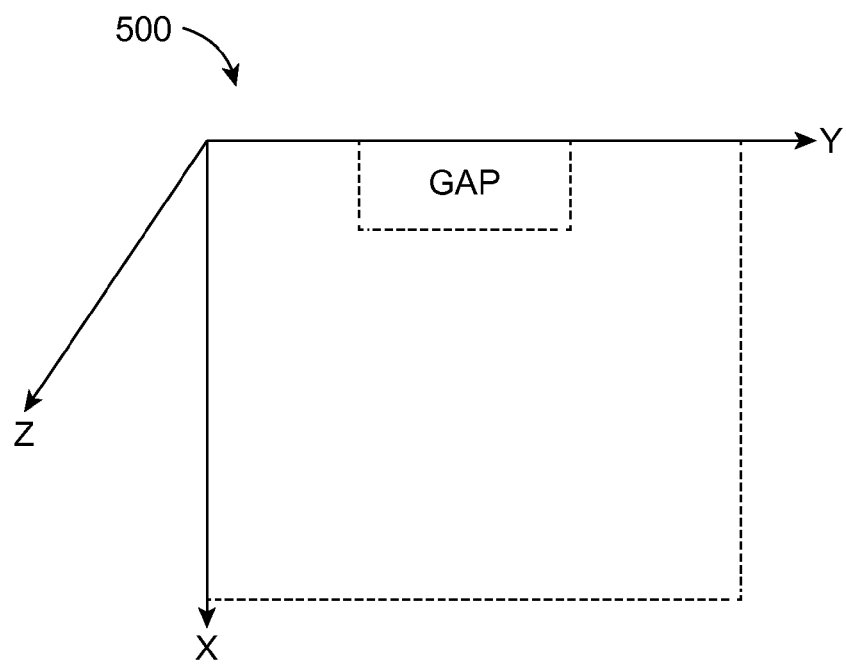
FIGS. 8A-8B are graphs of an application of the coordinate transformation shown in FIG. 7.
Figure 8B:
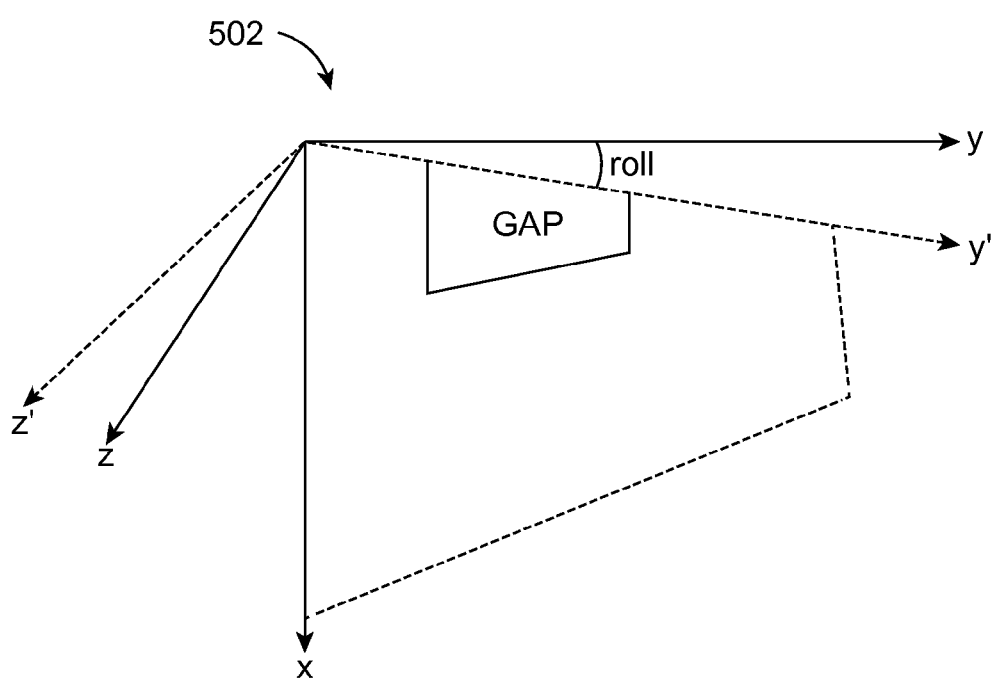

For implementations in which position is calculated in a two-dimensional map in the x-y plane, the roll angle is estimated. Here, the above calculations are utilized to determine the roll angle, which is the rotation along the y-z plane rotating around the x-axis. An example of this rotation is shown by diagrams 500, 502 in FIGS. 8A-8B.

The estimate may be given within a discrete set of camera rotation states. For example, given possible tilt states, e.g., tilted up, parallel or down to the ground (or, for instance, +15, 0, or −15 degrees), the roll angle may be estimated. In particular, the tilt angle of the camera, or the sign of the tilt angle (e.g., positive (upward) tilt or negative (downward) tilt) is estimated based on determined image features, camera sensor data, or the like. Based on this estimation, the following definitions are employed:

$$\lambda_1 = \begin{cases} \dfrac{1}{\sqrt{\left(\dfrac{u1 - u0}{a}\right)^2 + 1}} & \text{if } (u1 - u0) \geq 0 \\ \dfrac{-1}{\sqrt{\left(\dfrac{u1 - u0}{a}\right)^2 + 1}} & \text{if } (u1 - u0) < 0 \end{cases}$$

$$\lambda_2 = \begin{cases} \dfrac{1}{\sqrt{\left(\dfrac{u2 - u0}{a}\right)^2 + \left(\dfrac{v2 - v0}{a}\right)^2 + 1}} & \text{if } (v2 - v0) \geq 0 \\ \dfrac{1}{\sqrt{\left(\dfrac{u2 - u0}{a}\right)^2 + \left(\dfrac{v2 - v0}{a}\right)^2 + 1}} & \text{if } (v2 - v0) < 0 \end{cases}$$

$$\text{tilt} = \sin^{-1}(-1/\lambda_1)$$
$$\text{roll} = \cos^{-1}(\lambda_2(v2 - v0)/a)$$

The sign of $\lambda_1$ is determined by $(u_1-u_0)$, and the sign of $\lambda_2$ is determined by $(v_2-v_0)$, given the tilt and roll angles are within −90 to +90 degrees. This provides a rough estimation of the roll (e.g., looking from the left or right). If only a vanishing point in the vertical direction is detected, the range of the roll may be determined in a similar manner to the above.

In addition to the techniques described above, the rotation of the camera with respect to an image can be determined at least partially via orientation sensors (e.g., accelerometers, gyroscopes, etc.) associated with the camera. Thus, in the example above, the tilt of the camera with respect to the earth, or a direction of the tilt (e.g., upward or downward) could be computed from acceleration data in addition to, or in place of, image data. For example, a gravity vector determined using information from the sensors may be used to compute the tilt and/or pan of the camera, as described above and shown in FIG. 8. Additionally, at least a portion of information used for determining the rotation of the camera with respect to an image can be obtained by other means other than the image itself. For instance, such information may be obtained from network measurements as provided above, e.g., by comparing the network measurements to heatmap or signature data.

As another example, for images in which multiple targets or surfaces are identified, information relating to each of the detected targets and/or surfaces can be used to further refine the rotation estimate of the camera. For instance, processing for an image that depicts two or more non-parallel walls, such as intersecting walls or an inside or outside corner, may proceed by extracting information corresponding to edge line features and vanishing points for each of the detected walls. The combined information corresponding to each of the detected edge line features and vanishing points may subsequently be used to enhance the accuracy of the rotation estimate of the camera, as described above.

The techniques described above can be applied for a scenario in which any given image captured by the camera 135 contains one object of interest. If multiple objects exist in an image, and the objects are associated with different walls in the surrounding environment, vanishing points corresponding to each of the objects can be identified and used to aid in the calculations described above.

By utilizing the techniques described above, robust rough estimation of camera pose can be performed with respect to a 2D map even when the number and/or placement of key points from computer vision detection are not sufficient for pose estimation on their own. Rough estimation of camera rotation to a storefront or other target may be performed with horizontal vanishing point only, or multiple vanishing points. Further, the estimation can tolerate a certain amount of imperfection in the detected lines. For positioning purposes where a map is used, the estimation described herein results in a significant improvement in positioning accuracy.

As discussed above, after a storefront sign or other POI is detected, pose estimation is performed based on the lines around the POI, such as edges of the floor, roof, etc., instead of the POI itself. The camera view of the location may be estimated based on the doors, roof, and/or floor lines that are parallel to the plane of the detected image. Accurate vanishing point position(s) can be used to calculate the pan and tilt angles when the relevant camera parameters are known. When the camera parameters are unknown, rough estimation (e.g., view from left, right, top or bottom) can be performed.

Figure 9:
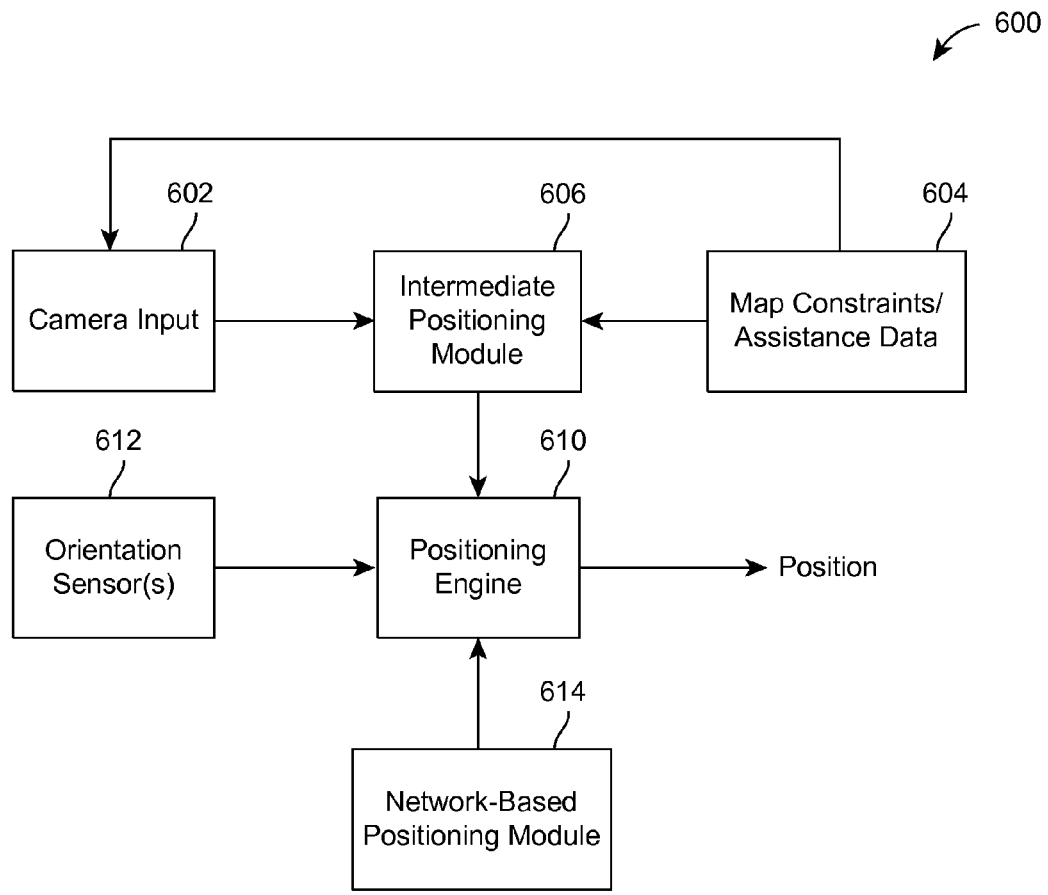
FIG. 9 is a block diagram of an indoor positioning system that utilizes vision-based positioning.

FIG. 9 illustrates a positioning system 600 that can utilize the camera pose estimation techniques as described above. The system 600 operates by visually searching known objects and matching them to POIs on a map, from which a user's location within an area can be determined. For instance, the system 600 can estimate a user's position within a shopping mall by visually searching logos for different retailers, matching the logos to locations within the shopping mall, and determining the user's position based on the determined locations. Alternatively, a user can provide images of various locations in the area as well as identifications of POIs located within each of the images.

To utilize the system 600, a user activates a camera associated with a device to be located and captures one or more images of its surroundings via the camera, e.g., by panning the device around the surroundings, capturing one or more images while the device is stationary, etc. The resulting camera input 602 is passed to an intermediate positioning module 606, which identifies store logos and/or other objects from the camera view and compares these objects to POIs based on assistance data 604 that includes POI or visual signature databases, map constraint data associated with the area, etc. Object identification can be performed based on image feature extraction and matching and/or any other technique(s). In the event that problems are encountered in matching objects, the user can be given feedback for re-obtaining camera input 602, such as slowing down the panning, panning a larger radius, etc.

The intermediate positioning module matches detected POIs to their locations according to the assistance data 604. The intermediate positioning module also determines rotation angles associated with respective images of POIs, as discussed above. Based on these locations, the associated camera rotation angles and map constraints associated with the assistance data 604, an intermediate location of the device is estimated. For instance, the user location can be estimated based on the possible region from which a detected POI is visible, based on the map constraints, the angle at which the camera views the POI, and the known location of the POI. Other techniques are also possible. This intermediate location is provided to a positioning engine 610, which combines the intermediate location with other position location data, such as measurements obtained from one or more orientation sensors 612 (e.g., an accelerometer, gyroscope, compass, etc.), network measurements (e.g., received signal strength indication (RSSI), round trip time (RTT), etc.) obtained from a Wi-Fi network or other wireless communication network via a network-based positioning module 614, or the like. Distance between the camera and respective detected POIs may also be calculated or estimated based on, e.g., the size of the POI within the camera imagery, a zoom factor of the camera, orientation of the camera, known size of the POI, etc., and further provided to the positioning engine 610. The positioning engine 610 utilizes the combined position location data to obtain a final position estimate for the device. While the positioning engine 610 is shown as obtaining information from the intermediate positioning module 606, the orientation sensor(s) 612 and the network-based positioning module 614, the positioning engine 610 may obtain data from less than all of these sources, and/or the positioning module 610 may obtain data from other sources not illustrated.

The system 600 may be implemented by the mobile device 12. For example, the orientation sensor(s) 612 may be the orientation sensor(s) 132, and the camera input 602, the map constraints/assistance data 604, the intermediate positioning module 606, the positioning engine 610, and the network-based positioning module 614 may be provided and/or implemented by the general-purpose processor 111 and/or the DSP 112, the memory 140, and the camera 135.

Figure 10:
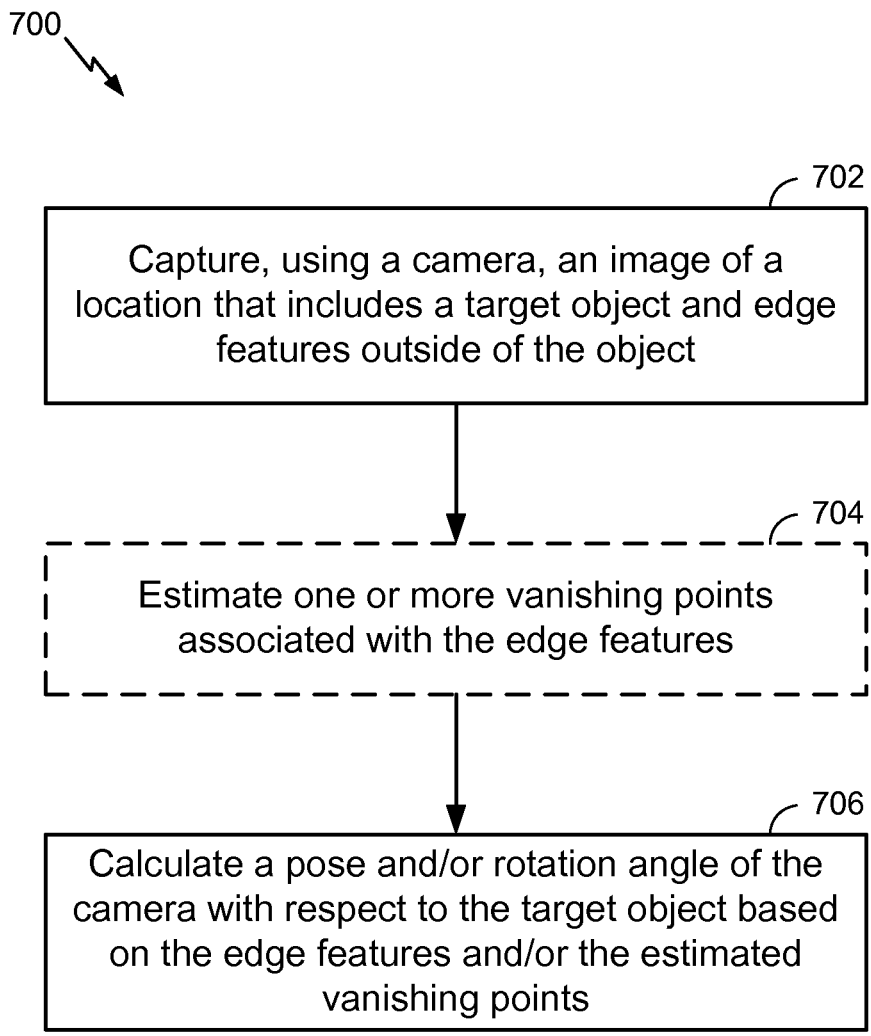
FIG. 10 is a block flow diagram of a process of estimating camera pose corresponding to an image.

Referring to FIG. 10, with further reference to FIGS. 1-9, a process 700 of estimating camera pose corresponding to an image includes the stages shown. The process 700 is, however, an example only and not limiting. The process 700 can be altered, e.g., by having stages added, removed, rearranged, combined, and/or performed concurrently. Still other alterations to the process 700 as shown and described are possible.

At stage 702, an image of a location, such as a storefront within an area, is captured using a camera 135. The image includes a target object (e.g., a storefront logo) and edge line features outside of the target object. The peripheral edge line features are derived (e.g., by an edge extractor 302) from features of the location surrounding the target object, such as a floor or roof, doors, windows, etc.

At stage 704, one or more vanishing points associated with the edge line features from the image captured at stage 702 are estimated, e.g., by a vanishing point estimator 304.

At stage 706, a pose or heading of the camera 135 is calculated (e.g., by a rotation matrix computation module such as the module 306) with respect to the target object based on the edge features detected at stage 702 and/or one or more vanishing points estimated at stage 704. The nature of the calculations performed at stage 706 may depend on the number of vanishing points identified at stage 704. For instance, if one vanishing point is identified at stage 704, a rough estimation of the camera rotation may be performed at stage 706. Alternatively, if two or more vanishing points are identified at stage 704, the camera rotation may be calculated at 706 with higher precision. Other information, such as acceleration data provided by orientation sensors, may also be utilized in the calculations at stage 706, as discussed above. Upon completion of the calculations at stage 706, the calculated camera pose may be utilized to enhance indoor positioning accuracy, and/or for other purposes, as provided above.

Figure 11:
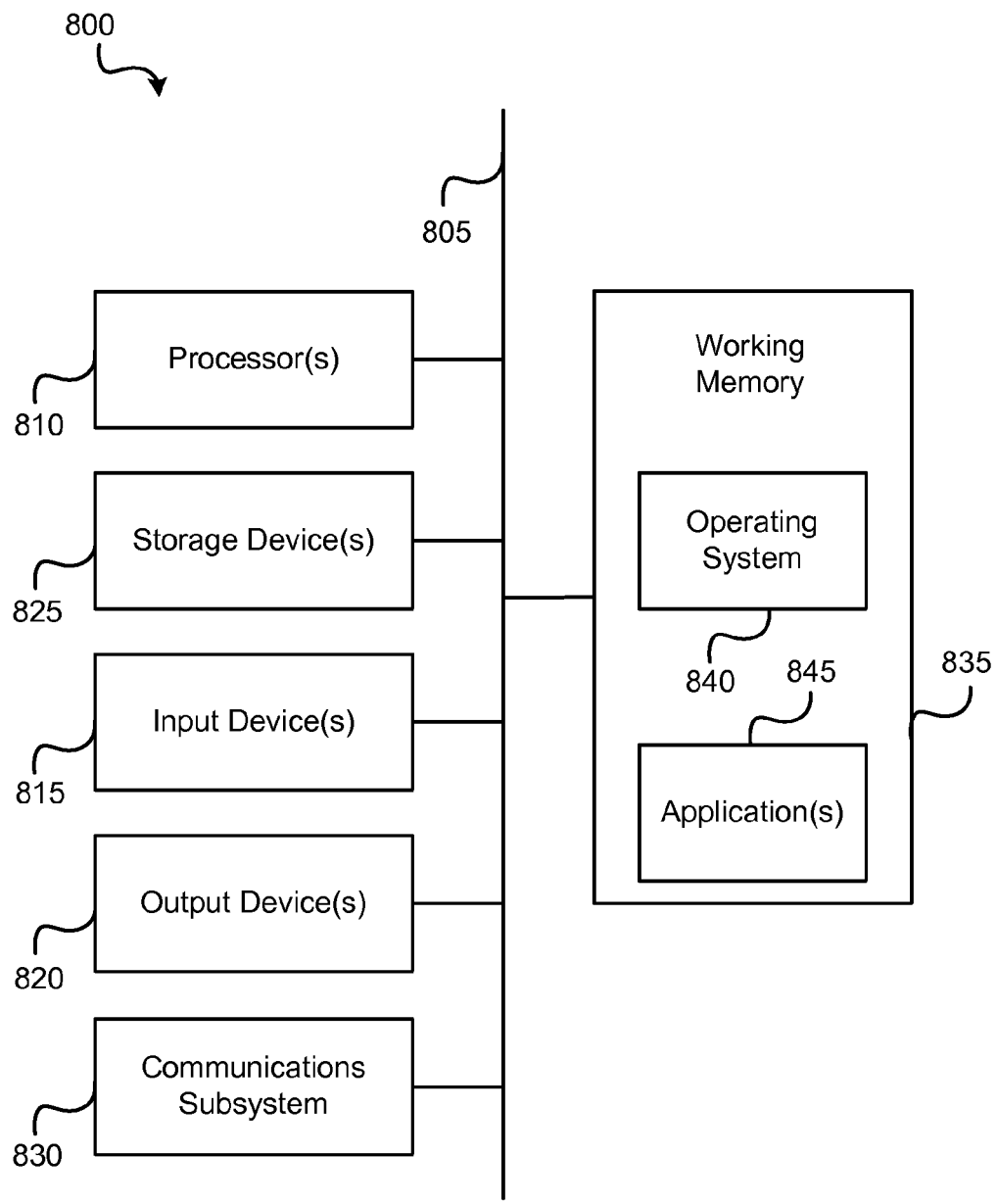
FIG. 11 is a block diagram of an example of a computer system.

A computer system 800 as illustrated in FIG. 11 may be utilized to at least partially implement the components and/or the functionality of the previously described computerized devices, such as the devices shown in FIGS. 2, 3, and 9. FIG. 11 provides a schematic illustration of one embodiment of a computer system 800 that can perform the methods provided by various other embodiments, as described herein, and/or can function as a mobile device or other computer system. FIG. 11 provides a generalized illustration of various components, any or all of which may be utilized as appropriate. FIG.

11, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like. The processor(s) 810 can include, for example, intelligent hardware devices, e.g., a central processing unit (CPU) such as those made by Intel® Corporation or AMD®, a microcontroller, an ASIC, etc. Other processor types could also be utilized.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise, as here, a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 800) may be used to perform methods in accordance with the disclosure. Some or all of the procedures of such methods may be performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for estimating camera pose, the method comprising:
    obtaining an image of a location captured via a camera, wherein the image includes a target object and edge line features outside of the target object;
    identifying the target object, as an identified target object, from a set of known reference objects; and
    calculating a pose of the camera with respect to the identified target object based on the edge line features.

2. The method of claim 1 wherein identifying the target object comprises identifying the target object via a computer vision algorithm, by comparing the target object with the set of known reference objects, independently of calculating the pose of the camera.

3. The method of claim 2 wherein the identifying comprises detecting key points of the target object in the image.

4. The method of claim 1 further comprising receiving an identity of the target object within the image from user input.

5. The method of claim 1 further comprising estimating one or more vanishing points associated with the edge line features, wherein the calculating comprises calculating the pose of the camera with respect to the target object based on the estimated vanishing points.

6. The method of claim 5 further comprising detecting the edge line features within the image.

7. The method of claim 6 wherein detecting the edge line features comprises detecting horizontal edge line features and vertical edge line features.

8. The method of claim 7 wherein detecting the edge line features comprises detecting at least one of a floor, a roof, or a door.

9. The method of claim 7 wherein estimating the one or more vanishing points comprises at least one of estimating a horizontal vanishing point from the horizontal edge line features or estimating a vertical vanishing point from the vertical edge line features.

10. The method of claim 5 wherein:
    estimating the one or more vanishing points comprises estimating one vanishing point; and
    calculating the pose of the camera comprises estimating rotation of the camera with respect to a plane, defined by a detectable target in the image, from a set of discrete rotation states based on the one estimated vanishing point.

11. The method of claim 5 wherein:
    estimating the one or more vanishing points comprises estimating two or more vanishing points; and
    calculating the pose of the camera comprises calculating the pose of the camera as at least one of pan, tilt, or roll with respect to a plane, defined by a detectable target in the image, based on the two or more vanishing points.

12. The method of claim 11 wherein calculating the pose comprises calculating the roll, the pan, and the tilt.

13. The method of claim 12 further comprising obtaining information relating to at least one of the tilt or the pan from an orientation sensor coupled to the camera.

14. The method of claim 12 further comprising determining the roll based at least in part on the tilt.

15. The method of claim 1 further comprising determining a location of the target object within a geographical area independently of calculating the pose of the camera based on map data for the geographical area.

16. The method of claim 15 further comprising estimating a position of a user of the camera within the geographical area based on the location of the target object and the pose of the camera.

17. A system for estimating camera pose, the system comprising:
a camera configured to capture an image of a location including a target object; and
a processor configured to:
detect edge line features outside of the target object within the image;
identify the target object, as an identified target object, from a set of known reference objects; and
calculate a pose of the camera with respect to the identified target object based on the edge line features.

18. The system of claim 17 wherein the processor is further configured to:
estimate one or more vanishing points associated with the edge line features, and
calculate the pose of the camera based on the vanishing points.

19. The system of claim 18 wherein the edge line features comprise horizontal edge line features and vertical edge line features.

20. The system of claim 19 wherein the edge line features correspond to at least one of a floor, a roof, or a door.

21. The system of claim 19 wherein the processor is further configured to perform at least one of estimating a horizontal vanishing point from the horizontal edge line features or estimating a vertical vanishing point from the vertical edge line features.

22. The system of claim 18 wherein the processor is further configured to:
estimate one vanishing point; and
estimate rotation of the camera with respect to a plane, defined by a detectable target in the image, from a set of discrete rotation states based on the one estimated vanishing point.

23. The system of claim 18 wherein the processor is further configured to:
estimate two or more vanishing points; and
calculate the pose of the camera as at least one of pan, tilt, or roll with respect to a plane, defined by a detectable target in the image, based on the two or more vanishing points.

24. The system of claim 23 wherein the processor is further configured to calculate roll, pan, and tilt to calculate the pose of the camera.

25. The system of claim 24 further comprising an orientation sensor coupled to the camera, wherein the processor is further configured to obtain information relating to at least one of the tilt or the pan from the orientation sensor.

26. The system of claim 24 wherein the processor is further configured to determine the roll based at least in part on the tilt.

27. The system of claim 17 wherein the processor is further configured to determine a location of the target object within a geographical area independently of calculating the pose of the camera based on map data for the geographical area.

28. The system of claim 27 wherein the processor is further configured to estimate a position of a user of the camera within the geographical area based on the location of the target object and the pose of the camera.

29. A system for estimating camera pose, the system comprising:

means for capturing an image of a location, wherein the image includes a target object;
means for detecting edge line features outside of the target object within the image;
means for identifying the target object, as an identified target object, from a set of known reference objects; and
means for calculating a pose of the means for capturing with respect to the identified target object based on the edge line features.

30. The system of claim 29 further comprising means for estimating one or more vanishing points associated with the edge line features, wherein the means for calculating comprises means for calculating the pose of the means for capturing based on the vanishing points.

31. The system of claim 29 wherein the means for detecting the edge line features comprises means for detecting horizontal edge line features and vertical edge line features.

32. The system of claim 31 wherein the means for detecting the edge line features comprises means for detecting at least one of a floor, a roof, or a door.

33. The system of claim 30 wherein the means for estimating the one or more vanishing points comprises at least one of means for estimating a horizontal vanishing point from the horizontal edge line features or means for estimating a vertical vanishing point from the vertical edge line features.

34. The system of claim 30 wherein:
the means for estimating the one or more vanishing points comprises means for estimating one vanishing point; and
the means for calculating the pose of the means for capturing comprises means for estimating rotation of the means for capturing with respect to a plane, defined by a detectable target in the image, from a set of discrete rotation states based on the one estimated vanishing point.

35. The system of claim 30 wherein:
the means for estimating the one or more vanishing points comprises means for estimating two or more vanishing points; and
the means for calculating the pose of the means for capturing comprises means for calculating the pose of the means for capturing as at least one of pan, tilt, or roll with respect to a plane, defined by a detectable target in the image, based on the two or more vanishing points.

36. The system of claim 35 wherein the means for calculating the pose of the means for capturing comprises means for calculating the pose of the means for capturing as roll, pan, and tilt.

37. The system of claim 36 further comprising means for obtaining information relating to at least one of the tilt or the pan from an orientation sensor coupled to the means for capturing.

38. The system of claim 36 further comprising means for determining the roll based at least in part on the tilt.

39. A non-transitory processor-readable storage medium comprising processor-executable instructions configured to cause a processor to:
obtain an image of a location captured via a camera, wherein the image includes a target object and edge line features outside the target object;
identify the target object, as an identified target object, from a set of known reference objects; and
calculate a pose of the camera with respect to the identified target object based on the edge line features.

40. The non-transitory processor-readable storage medium of claim 39 further comprising instructions configured to cause the processor to:

estimate one or more vanishing points associated with the edge line features; and calculate the pose of the camera based on the vanishing points.

* * * * *